United States Patent
van der Velde

(10) Patent No.: US 9,441,751 B2
(45) Date of Patent: Sep. 13, 2016

(54) AIR PIPE HEAD

(71) Applicant: Winteb Beheer B.V., Winschoten (NL)

(72) Inventor: Albert Anton van der Velde, Winschoten (NL)

(73) Assignee: WINTEB BEHEER B.V., Winschoten (NL)

(*) Notice: Subject to any disclaimer, the term of this patent is extended or adjusted under 35 U.S.C. 154(b) by 0 days.

(21) Appl. No.: 14/221,384

(22) Filed: Mar. 21, 2014

(65) Prior Publication Data

US 2014/0283916 A1 Sep. 25, 2014

(30) Foreign Application Priority Data

Mar. 22, 2013 (NL) ...................................... 2010510

(51) Int. Cl.
*F16K 33/00* (2006.01)
*F16K 24/04* (2006.01)

(52) U.S. Cl.
CPC ........... *F16K 24/042* (2013.01); *F16K 24/046* (2013.01); *Y10T 137/0318* (2015.04); *Y10T 137/7358* (2015.04)

(58) Field of Classification Search
CPC ..... B65D 47/04; G01F 11/286; G01F 11/04; F16K 24/042; F16K 24/046
USPC .......................... 137/409, 429, 843; 222/425
See application file for complete search history.

(56) References Cited

U.S. PATENT DOCUMENTS

| 785,594 | A | | 3/1905 | Crispin |
|---|---|---|---|---|
| 2,388,481 | A | | 11/1945 | Green |
| 3,502,047 | A | | 3/1970 | Crosbie |
| 5,613,513 | A | * | 3/1997 | Makowan ......................... 137/1 |

FOREIGN PATENT DOCUMENTS

| GB | 2012023 A | 7/1979 |
|---|---|---|
| NL | 1014531 C2 | 9/2001 |
| WO | 9845631 A1 | 10/1998 |
| WO | 2013120987 A1 | 8/2013 |

OTHER PUBLICATIONS

Dutch Search Report and Written Opinion, dated Aug. 23, 2013.

* cited by examiner

*Primary Examiner* — Kevin Lee
*Assistant Examiner* — P. Macade Nichols
(74) *Attorney, Agent, or Firm* — Gianna J. Arnold; Saul Ewing LLP

(57) ABSTRACT

An air pipe head having a housing bounding a venting channel and a chamber. The venting channel has an end port opening downwards into the chamber. A float member is arranged in the chamber and guided for guided movement between an uppermost position closing off the end port and a lowermost position spaced below the end port. The chamber communicates with surroundings of the air pipe head via at least one side port. A downwardly facing surface portion of the float member in its lowermost position is shielded in substantially all lateral directions and an upper surface portion of the float member in its lowermost position is left exposed through said side port.

9 Claims, 4 Drawing Sheets

AIR PIPE HEAD

CROSS-REFERENCE TO RELATED APPLICATIONS

This application is based on, and claims priority to, NL Application No. 2010510, filed Mar. 22, 2013, the entire contents of each of which being fully incorporated herein by reference.

FIELD AND BACKGROUND OF THE INVENTION

The invention relates to an air pipe head for venting a tank of a vessel, such as a ballast tank, an oil tank, a fresh water tank or a sewage tank.

When a tank of a vessel is filled with a liquid, it needs to be vented to allow air to escape from the tank as the tank is filled. Also, in many cases, one or more vents that are provided for this purpose also need to be capable to operate as overflow passages, to allow liquid to escape when a tank is filled to its full capacity, to protect the pumps and the tank from damage. Conversely, when a tank is emptied, the vent provides for a passage that allows air to enter the tank to take up the volume left by the discharged liquid. Furthermore, the vents allow air to flow in and out of the tank to equalize pressure difference due to variations in temperature.

For vents having an outer opening at a deck of a vessel or otherwise exposed to waves, it has to be ensured that no or no significant volumes of splash water can enter the vent even when exposed to heavy weather along with a lot of splash water or even waves running over the deck. An example of such an air pipe head according to the introductory portion of claim 1 is known from Dutch patent 1014531. Such an air pipe head has a housing bounding a venting channel and a chamber, wherein the venting channel has an end port opening downwards into the chamber. A float member is arranged in the chamber and guided for guided movement between an uppermost position closing off the end port and a lowermost position spaced below the end port. The chamber communicates with surroundings of the air pipe head via at least one side port. If splash water or a wave runs over the deck and into the chamber towards the end port, the float member is caused to float up against the end port and temporarily closes off the end port to prevent water from entering, until the water has flowed away and the float descends back to its lowermost position again leaving the end port of the vent free. Depending on the extent to which the entry of water through the pipe head must be avoided, the side ports may have an upper end that is above or near the upper end of the float in its lowermost position for achieving high flow rates or have an upper end at a much lower level, for instance below a center of the float in its lowermost position or near the lower end of the float in its lowermost position to more effectively shield the end port from water ingress.

In many applications, an important characteristic of such air pipe heads is the flow rate of air into the tank, so that the tank can be emptied quickly, and the flow rate of liquid out of the tank so that no damage occurs even when the tanks is filled at a high flow rate until it flows over via the vents. Arranging the upper contour of the side ports lower will generally go at the expense of achievable flow rates.

SUMMARY OF THE INVENTION

It is an object of the invention to provide an air pipe head that allows a higher flow rate of ambient air into the tank.

According to the invention, this object is achieved by providing an air pipe head including a housing bounding a venting channel and a chamber, wherein the venting channel has an end port opening downwards into the chamber, wherein a float member is arranged in the chamber and guided for guided movement between an uppermost position closing off the end port and a lowermost position spaced below the end port, wherein the chamber communicates with surroundings of the air pipe head via at least one side port, and wherein a downwardly facing surface portion of the float member in its lowermost position is shielded in substantially all lateral directions and an upper surface portion of the float member in its lowermost position is left exposed through the side port.

Because a downwardly facing portion of the float member in its lowermost position is shielded in substantially all lateral directions, i.e. also in the lateral directions in which the side port or side ports are facing, and an upper surface portion of the float member in its lowermost position is left exposed through the side port or ports, the downwardly facing surface portion of the float member is substantially shielded from air that flows in through the side port or side ports towards the venting channel, so lift exerted by the air flow onto the float member is at least reduced and a higher flow rate can be reached without causing the float member to be lifted towards its uppermost position closing off the end port. Because an upper portion of the float member is left exposed, the shielding does not form a restriction that reduces the free cross-sectional area in the chamber available for air passing in and out or for liquid flowing out. Thus the capacity of the air pipe head with the float member in its lower position is substantially uncompromised.

The invention may also be embodied in a method of venting a tank of a vessel or allowing liquid to escape when the tank is filled to its full capacity, via a vent in which such an air pipe head is used.

Further objects, features, effects and details of the invention are described below with reference to the drawings.

DETAILED DESCRIPTION

Figure 1:
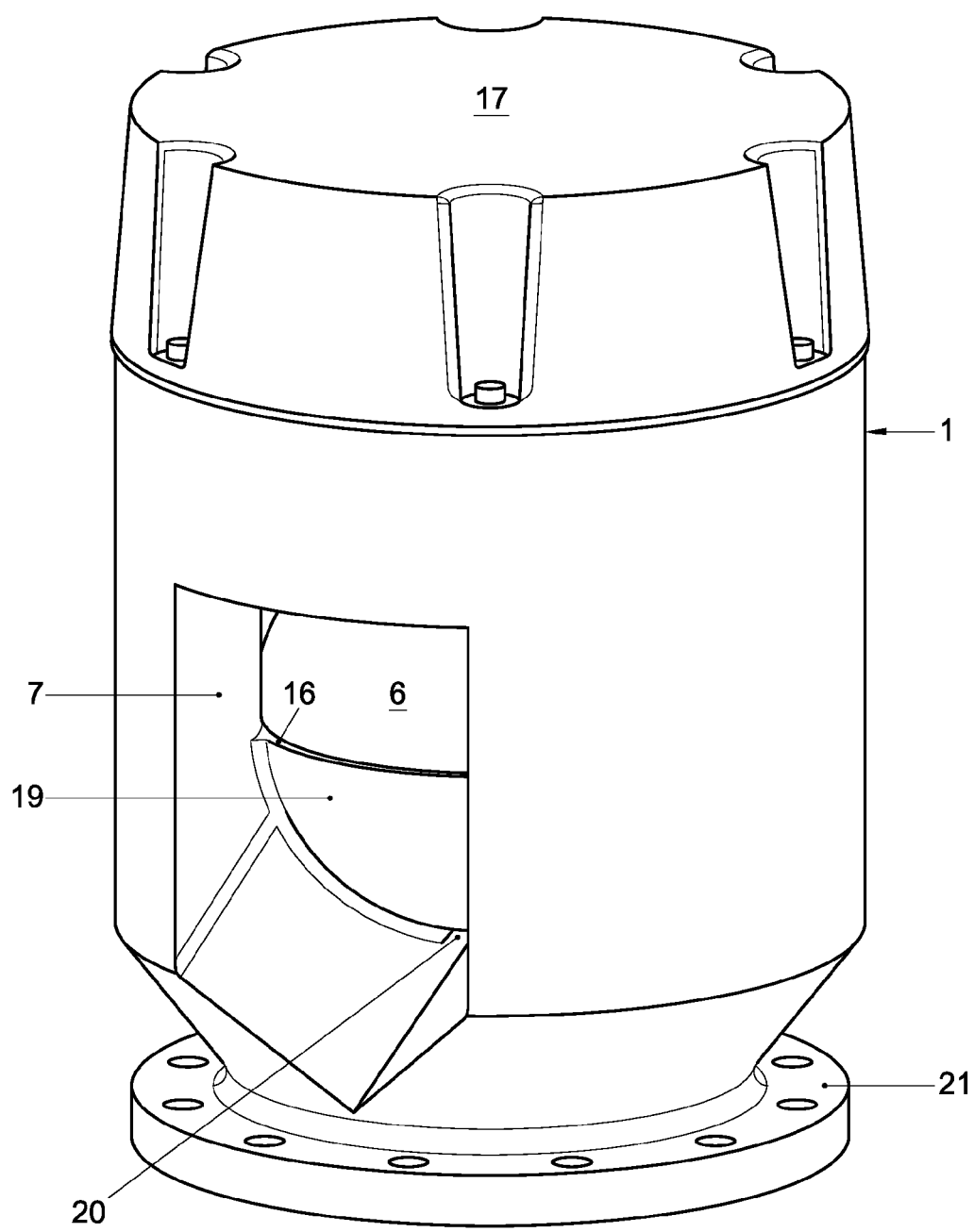
FIG. 1 is a perspective view of an example of an air pipe head according to the invention.
Figure 4:
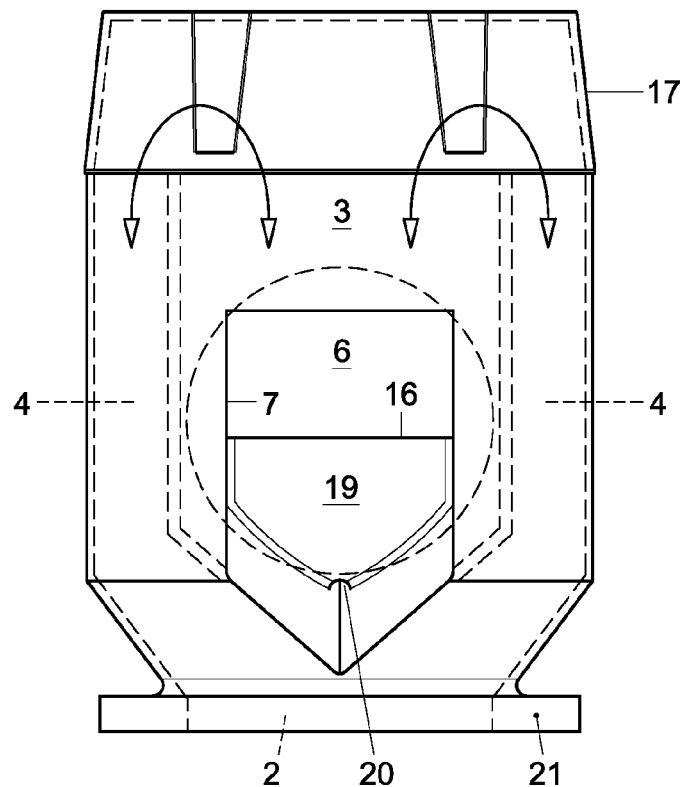
FIG. 4 is a side view of the air pipe head according to FIGS. 1 and 2 and the left hand part of FIG. 3 with a float member in its lowermost position.
Figure 5:
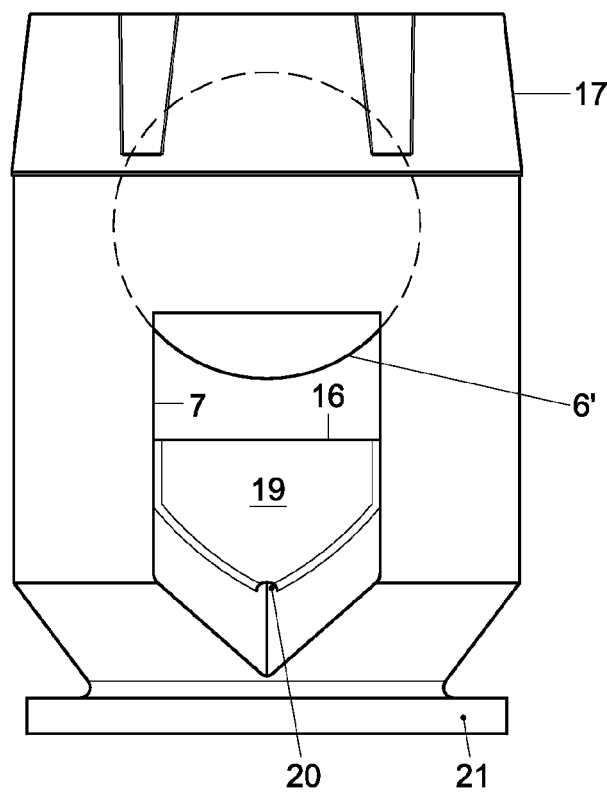
FIG. 5 is a side view of the air pipe head according to FIGS. 1 and 2, the left hand part of FIG. 3 and FIG. 4 with the float member in its uppermost position.

The invention is first described with reference to the example shown in FIGS. 1, 2, the left hand part of FIG. 3 and FIGS. 4. and 5. The air pipe head according to the example shown has a housing 1 including a removable cap 17 attached by screws and bounding a venting channel 2 with branches 4 extending on opposite sides outside a chamber 3. In the present example, the housing 1 is of cast aluminum, but may instead be made of other materials, such as plate material. The venting channel 2 has an end port 5 opening downwards into the chamber 3. A float member 6 is arranged in the chamber 3 and guided for guided movement between an uppermost position 6' (see FIGS. 3 and 5) closing off the end port 5 and a lowermost position 6 spaced below the end port 5. The chamber 3 communicates with surroundings of the air pipe head via side ports 7. A downwardly facing surface portion 8 of the float member 6 is shielded in substantially all lateral directions, when the float member 6 is in its lowermost position. An upper surface portion 9 of the float member 6 is left exposed when the float member 6 is in its lowermost position. In the example, this is best seen in FIG. 4 which shows a portion of the upper part 9 of the float member visible in laterally inward direction through the side port 7.

Figure 2:
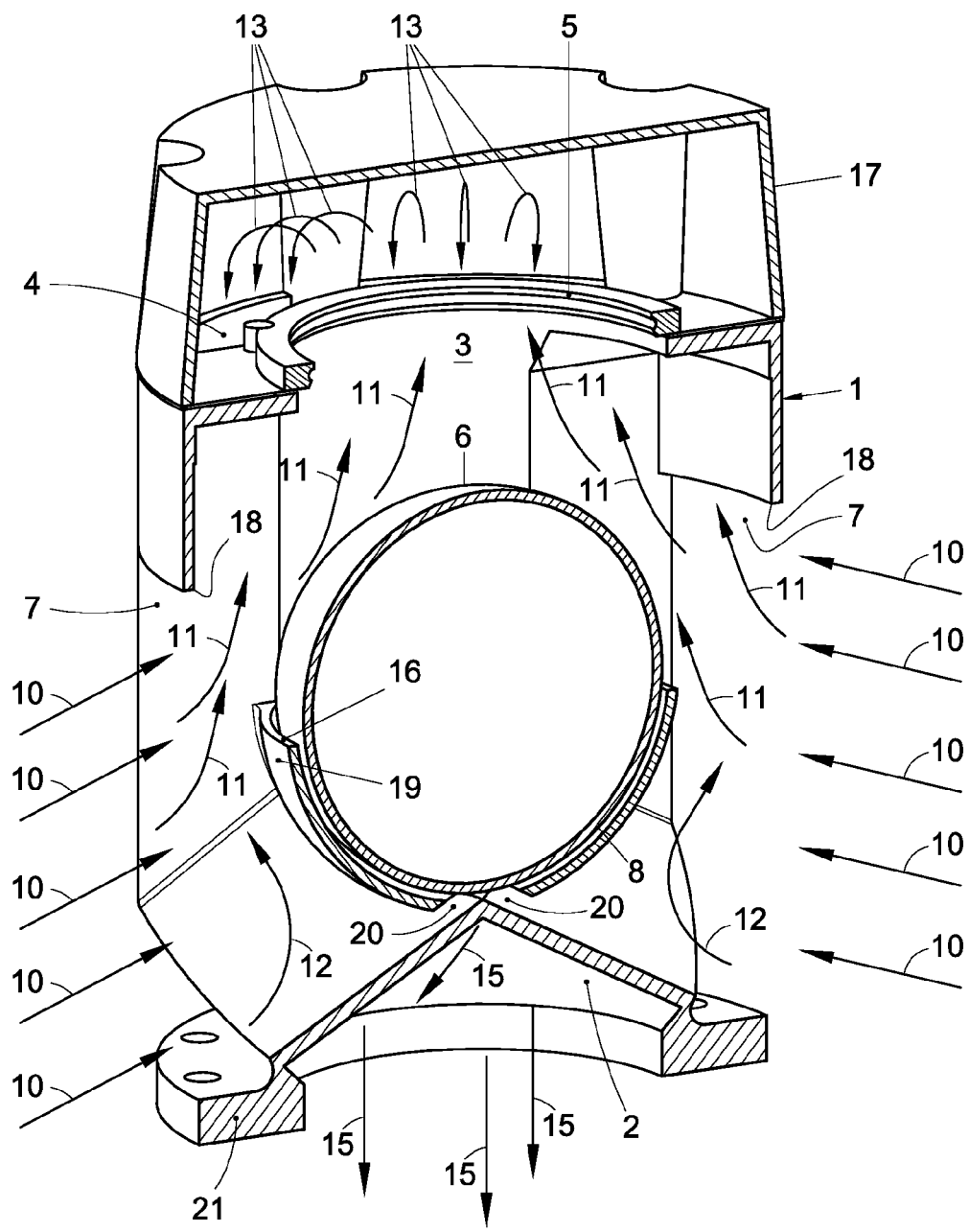
FIG. 2 is a perspective cross-sectional view of the air pipe head according to FIG. 1, with arrows indicating inward air flow.

In FIG. 2 arrows 10 indicate air flow from the surroundings of the air pipe head into the air pipe head. As indicated by arrows 11, 12, the air flow is deflected in upward direction towards the end port 5. Arrows 13 indicate how air is then guided from a common portion of the venting channel 2 adjacent to the end port 5 downwardly into branches 4 of the venting channel 2. Arrows 15 indicate the reconverged air flow downstream of the branches 4 into an air pipe or duct to which the air pipe head is mounted.

The downwardly facing surface portion 9 of the float member 6 is substantially shielded from air that flows in through the laterally oriented side ports 7 towards the venting channel, so lift exerted by the air flow onto the float member is at least reduced and a higher flow rate can be reached without causing the float member 6 to be lifted towards its uppermost position 6' closing off the end port 5. In particular air flow that is strongly deflected by the float member 6 is kept away from the float member 6 so it does not exert a lift force onto the float member. The air flow along the upwardly facing surface 9 of the float member 6 causes no or relatively little lift, because the air flow is deflected in upward direction by the upwardly facing surface 9 of the float member 6. Because the upwardly facing surface 9 of the float member 6 is left exposed to the environment through the respective side port 7, the shielding does not form a restriction that would reduce the free cross-sectional area in the chamber 3 available for air passing in and out or for liquid flowing out. Thus the capacity of the air pipe head with the float member 6 in its lower position is substantially uncompromised.

A portion of the shielding in each of the side ports 7 has an outer, upper end 16 extending closely along the float member 6 in its lowermost position. Furthermore, outer, upper end 16 is more remote from an inner upper boundary 18 of the respective side port 7 than a portion of the float member 6 closest to that inner upper boundary 18 of the side port 7. Thus, it is ensured that the shielding does not form a reduction of the minimal cross-sectional area adjacent to the float member 6 available for air and liquid to flow through, so that also from a regulatory point of view, ranges of application of the air pipe head are not reduced by the shielding.

In the present example, the shielding includes shields 19 that are each arranged in and each substantially closes off a lower portion of the respective, laterally oriented side port 7 and thus complete the shielding in all lateral directions partially provided by walls of the chamber 3. This allows the shielding in the lateral directions otherwise left open by side ports 7 to be provided, and even retrofitted in an existing air pipe head, in a simple manner by for instance welding or even snap fitting in the shielding as a lightweight item.

Upper ends of the shields 19 in the side ports are located inwardly of the upper and outer boundary of the respective, laterally oriented side port 7, so that resistance encountered by upward air flow into the air pipe head and downward flow of air and/or liquid out of the air pipe head is hardly if at all increased.

Furthermore, in the present example, the shields 19 as a whole are each located inwardly of an outer portion of the respective side port 7. Thus the shields 19 extend closely along the float member 6 and the volume of water that can be caught behind the shields 19, for instance after a wave has temporarily pushed the float member upwards, is limited.

Furthermore, the shields 19 have outer surfaces facing obliquely downward. Due to this feature, a wave running into a side port 7 is at least to a lesser extent deflected upward towards the end port 5, because it hits an obliquely downwardly facing surface of the shield. Accordingly, the risk of water ingress via the end port 5 before the float member 6 has closed off the end port 5 is reduced.

Under each shield 19, an opening 20 is left forming a drain under the float member 6 in its lowermost position. The drain allows water caught behind the shields 19 to flow away and the float member 6 to return to its lowermost position. The drain may also be dimensioned to enhance quick lifting of the float member 6 when water splashes or runs from the surroundings into a side port 7 with great force.

The float member can be provided in many different shapes, such as cylindrical, cone or double-cone shaped, prismatic (e.g. with triangular or rectangular cross-section). In the present example, the float member is a ball 6. This is advantageous, because a ball is a low cost item with no edges where stress concentrations may occur and wear is evenly distributed, since the ball 6 can rotate in any direction each time it opens and closes the end port 5.

The ball shaped float member 6 in its lowermost position is preferably substantially completely shielded over at least a lower 40% and more preferably at least a lower 45% of its height, so that lift caused by the air flowing upward through the side port 7 is very effectively reduced.

According to the present example, the air pipe head has two of said side ports 7 and venting channels (branches) 4 extending vertically between the side ports 7 and outside of the chamber 3. This provides a compact, relatively simple construction that allows high flow rates. However, also an air pipe head with a single side port or with three or more side ports is conceivable.

Figure 3:
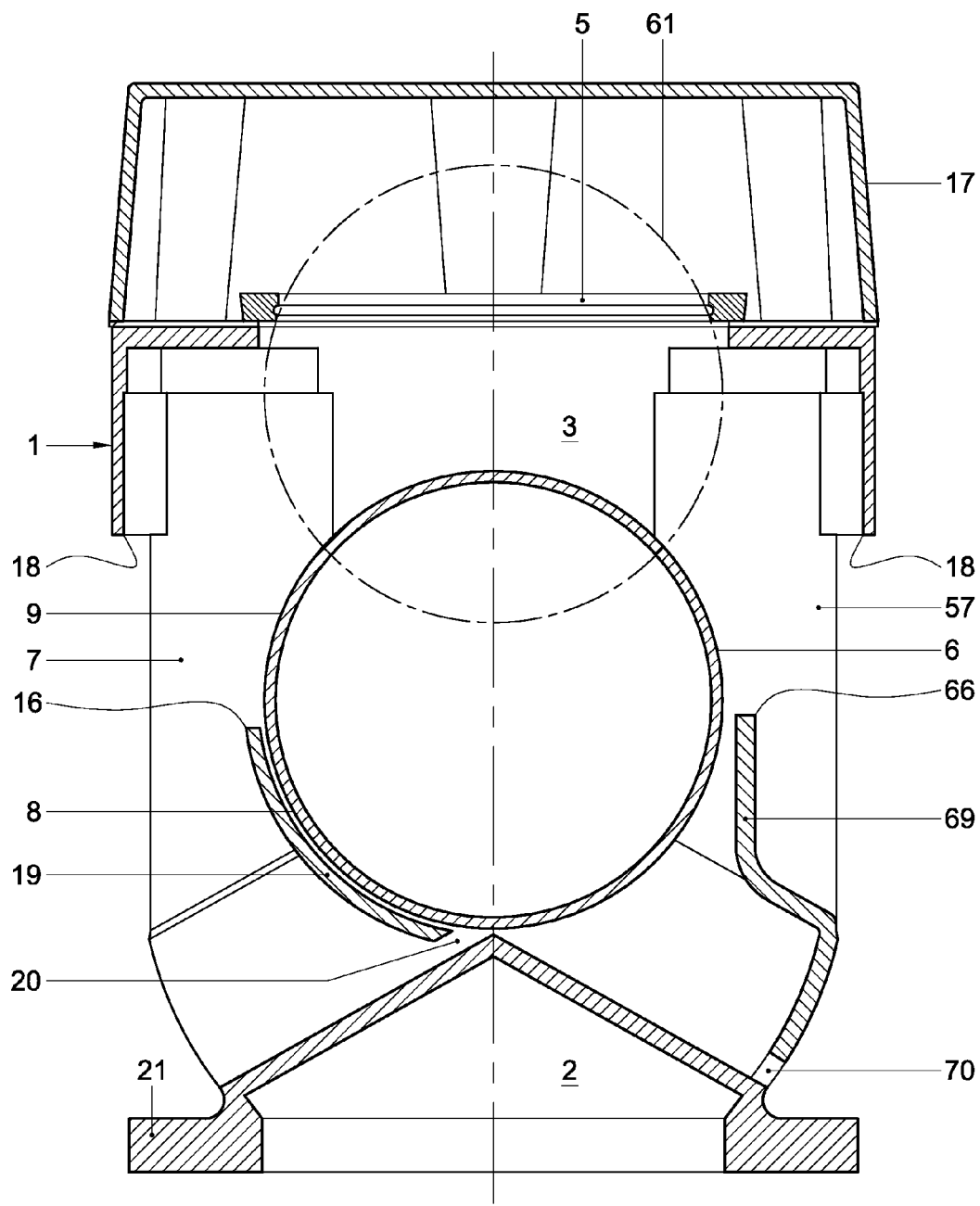
FIG. 3 is a side view in cross-section of halves of two examples of an air pipe head according to the invention, the left hand half being an air pipe head according to FIGS. 1 and 2.

Also, instead of in the form of a shield 19 mounted in a side port 7, the shielding may also be provided by suitably shaping the side port as is shown in the example at the right hand side of FIG. 3. In this example the shield 69 with an upper edge 66 constitutes a lower boundary of the side port 57. A drain opening 70 is located at the outside of the housing.

According to the present example, the air pipe head has a flange 20 for mounting the air pipe head to an air vent pipe. However, the air pipe head may also be provided with a connection of a different design, such as a threaded end.

The invention claimed is:

1. An air pipe head comprising:
   a housing bounding a venting channel and a chamber, wherein the venting channel has an end port opening downwards into the chamber, wherein a float member is arranged in the chamber and guided for guided movement between an uppermost position closing off the end port and a lowermost position spaced below the end port, wherein the chamber communicates with surroundings of the air pipe head via at least one side port, and wherein a downwardly facing surface portion of the float member in its lowermost position is shielded in substantially all lateral directions and an upper surface portion of the float member in its lowermost position is left exposed through said side port.

2. The air pipe head according to claim 1, wherein said shielding is effected at least in part by at least one laterally oriented side port or by forming a lower boundary of said side port, said side port having an outer, upper end extending along said float member in said lowermost position and more remote from an inner upper boundary of said side port than a portion of said float member in said lowermost position closest to said inner upper boundary of said side port.

3. The air pipe head according to claim 1, wherein said shielding includes at least one shield arranged in and substantially closing off a lower portion of an at least one laterally oriented side port.

4. The air pipe head according to claim 3, wherein an upper end of said at least one shield is located inwardly of an upper boundary of said side port.

5. The air pipe head according to claim 4, wherein said at least one shield is located inwardly of an outer boundary of said side port.

6. The air pipe head according to claim 3, wherein said at least one shield has an outer surface facing obliquely downward.

7. The air pipe head according to claim 1, wherein said float member in said lowermost position is substantially shielded over at least a lower 40 percent of a height of said float member height.

8. The air pipe head according to claim 1 comprising at least two of said side ports and a plurality of venting channel branches extending vertically between said side ports and outside of said chamber.

9. A method comprising the steps: venting a tank of a vessel or allowing liquid to escape when the tank is filled to its full capacity, via a vent comprising the air pipe head according to claim 1.

* * * * *